United States Patent [19]

Nelson et al.

[11] 4,199,163
[45] Apr. 22, 1980

[54] ONE-PIECE STEERABLE SLED

[76] Inventors: James Nelson, R.D. 1, Ironia Rd., Mendham, N.J. 07945; Robert J. Sainato, 10 Frances Rd., Lincoln Park, N.J. 07035; Tobin Wolf, 285 Aycrigg Ave., Passaic, N.J. 07055

[21] Appl. No.: 936,345

[22] Filed: Aug. 24, 1978

[51] Int. Cl.² .............................................. B62B 13/00
[52] U.S. Cl. ..................................... 280/22; 280/12 B
[58] Field of Search ............ 280/12 R, 12 A, 12 AA, 280/12 B, 18, 20, 22, 21 R, 24, 33.99 T, 639; 296/78 R, 84 R

[56] References Cited

U.S. PATENT DOCUMENTS

| | | | |
|---|---|---|---|
| 3,199,887 | 8/1965 | McKelvey | 280/18 |
| 3,372,944 | 3/1968 | Lauritzen | 280/20 |
| 3,376,046 | 4/1968 | Kivett et al. | 280/33.99 T |

FOREIGN PATENT DOCUMENTS 1321052  2/1963  France ....................................... 280/12

*Primary Examiner*—John A. Pekar
*Assistant Examiner*—D. W. Underwood
*Attorney, Agent, or Firm*—Jay M. Cantor

[57] ABSTRACT

A steerable plastic sled molded in one piece and requiring no factory assembly labor. The sleds are readily stackable, one above the other and within each other to provide minimum bulk during shipment. The sled includes a rear sitting section and a front leg section joined by a relatively flexible pleated or bellows-like section that permits the sled to flex in the horizontal plane to permit steering and to flex in the vertical plane to allow the sled to conform to uneven terrain. The sled includes a set of molded in runners.

In a second embodiment of the invention, there is provided a windshield which is joined to the front leg section by a molded living hinge and is secured to the leg section by rivets, bolts or the like. The windshield includes provision for steering.

Both embodiments are nestable and stackable for storage or shipment.

10 Claims, 6 Drawing Figures

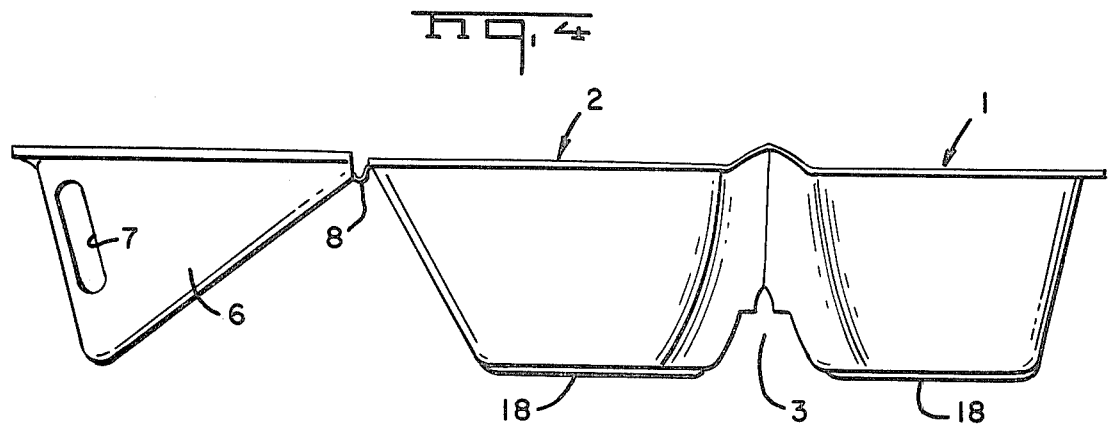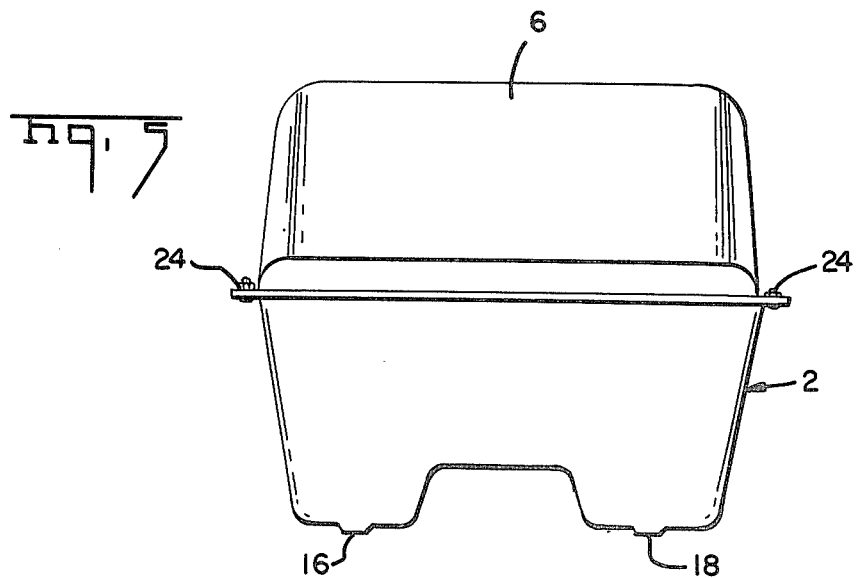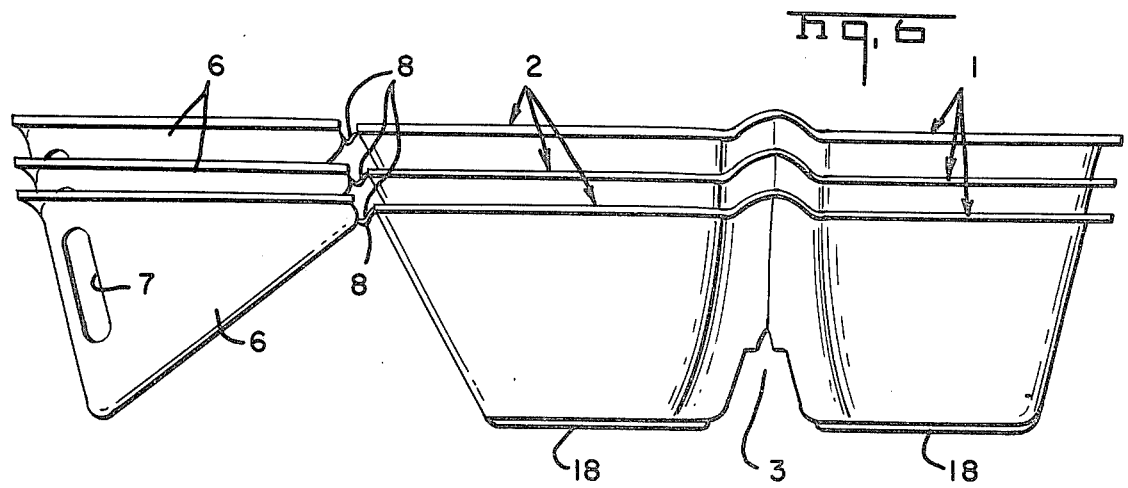

ONE-PIECE STEERABLE SLED

BACKGROUND OF THE INVENTION

1. Field of the Invention

This invention relates to sleds and particularly to sleds molded in one piece from plastic or the like which are steerable by the driver.

2. Description of the Prior Art

Plastic sleds which are molded in one piece are generally available and desirable because of their relatively low cost. However, such prior art one piece plastic sleds are non-steerable. In order to obtain the steering function, plastic sleds have been available, but these sleds have required additional parts and required assembly labor, thereby removing any cost advantages obtained over other types of steerable prior art sleds.

SUMMARY OF THE INVENTION

In accordance with the present invention, there is provided a one piece molded plastic sled which is steerable and requires no factory assembly and the labor concommitant therewith. An additional advantage of the sled in accordance with the present invention is that plural sleds can be nested, one within the other, for bulk shipment or storage, thereby providing a significant advantage in the cost of shipment. This is provided, in accordance with a first embodiment of the invention, by providing a single molded structure in two sections, a rear sitting section for the operator and a front or leg section for the operator. The two sections are joined by a relatively flexible pleated or bellows-like section that permits the sled to flex in a horizontal plane when the operator pulls on one side or the other side of a rope which is attached at opposite sides of the front portion of the leg section. This causes a rotation of the leg section in the horizontal plane relative to the rear sitting section and permits steering by the driver. A pair of runners is molded into each of the front and rear sections.

In accordance with a second embodiment of the invention, a third section which forms a windshield is molded along with the front and rear sections of the first embodiment and joined to the front section by a molded living hinge. The windshield is secured to the front section by means of bolts, rivets or the like and includes a pair of handle slots for use by the driver or operator in steering in place of the rope of the first embodiment. Each embodiment is stackable and nestable with other identical sleds.

BRIEF DESCRIPTION OF THE DRAWINGS:

FIG. 4 is a side view of the embodiment of FIG. 4 in the unassembled state;

FIG. 5 is a front view of the embodiment of FIG. 3; and

FIG. 6 is a side view of several of the embodiments of FIG. 4 in a stacked condition.

DESCRIPTION OF THE PREFERRED EMBODIMENTS

Figure 1:
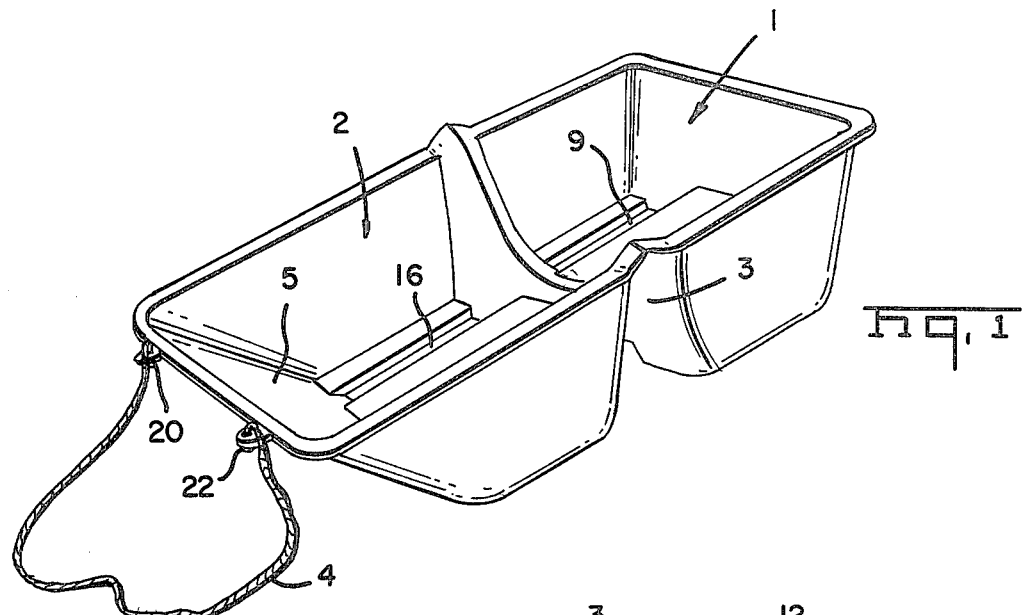
FIG. 1 is a perspective view of a first embodiment of the invention.
Figure 2:
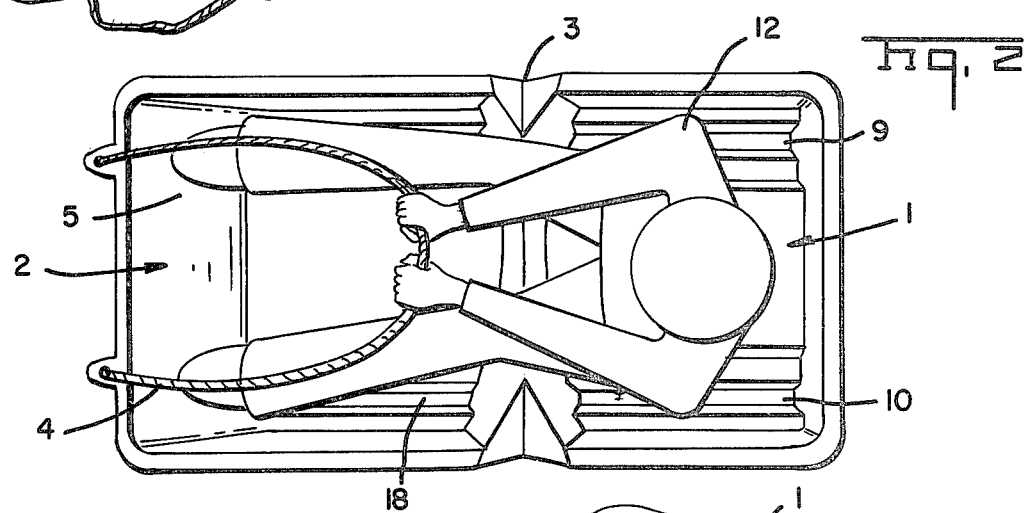
FIG. 2 is a top view of the embodiment of FIG. 1 showing an operator seated in the sled.

Referring first to FIGS. 1 and 2, there is shown a one piece molded plastic sled in accordance with the present invention. The sled includes a rear section 1 in which the operator sits and a front section 2 wherein the operator's legs are positioned, both of relatively rigid material. The front and rear sections are joined by a relatively flexible pleated or bellows-like section 3 which is flexible in the horizontal plane and permits the sled to flex in a horizontal plane when the operator 12 pushes against a side of the front wall 5 of the front section with one of his legs or pulls on the rope 4 secured to members 20 and 22 on either side thereof. Such molded pleats and their method of molding are well known in the art of plastic molding. It can be seen that such action of the operator's legs or operation of the rope will cause the front section 2 to rotate in a horizontal plane at the pleat 3 relative to the rear section 1, thereby changing the axis of the front section relative to the rear section and permitting steering. The pleated section 3 also permits the sled to flex in the vertical plane at the pleat, thus allowing the sled to always conform to uneven terrain. It is therefore apparent that by employment of the pleat 3, the front section of the sled 2 is capable of moving relative to the rear section 1 in both the vertical and the horizontal plane. The rear section 1 has a set of runners 9 and 10 molded into the base thereof. The front section 2 also includes a pair of runners 16 and 18, these runners also being shown in the embodiment of FIG. 5 wherein the front section and back sections are identical to FIG. 2.

It can be seen that, in operation, when the operator 12 pulls on one side of the rope 4 or pushes his foot against one side of the inclined front wall 5, the front section 2 will rotate relative to the rear section 1 in the horizontal plane. Accordingly, the runners 16 and 18 will rotate at an angle relative to the runners 9 and 10 and provide for steering.

Figure 3:
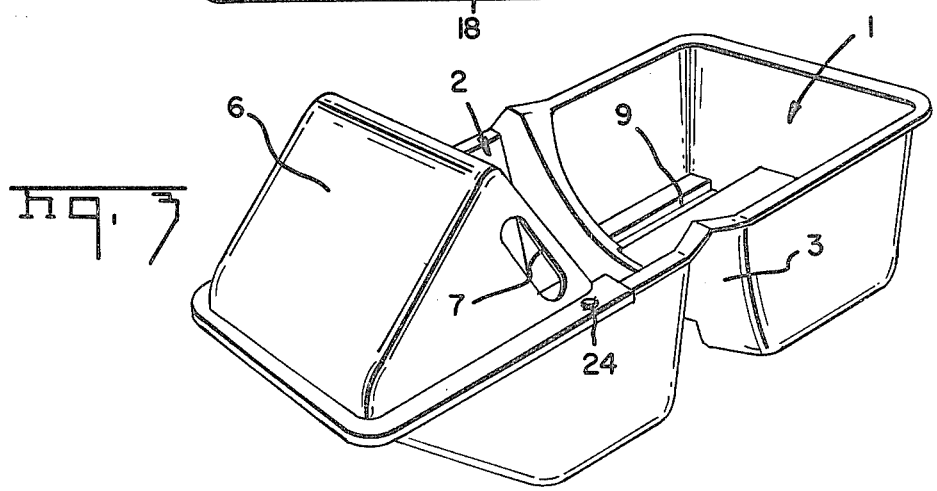
FIG. 3 is a perspective view in accordance with a second embodiment of the invention.

Referring now to FIGS. 3 through 5, there is shown a second embodiment of the present invention. In this embodiment, the front and rear sections 1 and 2 are identical to the embodiment of FIGS. 1 and 2 except that the rope 4 and the rope holding members 20 and 22 are replaced by a windshield section 6 having handle slots 7 formed therein, the windshield being attached to the front section 2 by means of a molded living hinge 8. Such hinges are well known in the plastic molding art. As shown in FIGS. 3 and 5, the windshield 6 is secured to the front section 2 by means of bolts 24, rivets or the like. Apertures are provided in both the side edge of the front section 2 as well as the windshield 6 to accommodate such bolts, rivets or the like. Steering takes place by the operator grasping the handle slots 7, there being one at each side of the windshield, and causing the front section 2 to rotate in the horizontal plane relative to the rear section 1 in the manner described above by pulling at one handle slot while pushing at the other.

Referring now to FIG. 6, there is shown the embodiment of FIGS. 3 to 5 in the unassembled condition with several such embodiments stacked one upon and within the other. It can be seen that the sleds can be stacked, one within the other, in a nested condition, thereby utilizing the minimum space for shipment or storage, thereby providing a great economic advantage. It is apparent that since the embodiment of FIGS. 1 and 2 is substantially identical to that of FIG. 3 through 5 except for the windshield section, the embodiment of FIGS. 1 and 2 is stackable in the same manner as shown for the embodiment of FIGS. 3 to 5 by way of FIG. 6.

There has been described in two embodiment a steerable sled which is inexpensivle to produce and inexpensive to store and ship through its stackable and nestable nature. This is provided by the flexible pleated or bellows-like section between the front and rear sections which provides rotation of the two sections relative to each other in both the vertical and horizontal planes.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:

1. A molded one piece steerable sled which comprises in combination,
   (a) a molded front section,
   (b) a molded rear section,
   (c) molded hinge means in the form of a pleat integral with said front and rear sections and flexible in a fixed plane passing through said front and rear section,
   (d) means to manually apply a force to said front section to rotate it in said fixed plane relative to said rear section,
   (e) said front section having a front, bottom and side walls,
   (f) said rear section having a rear, bottom and side walls, and
   (g) said hinge means connecting together the free ends of the bottom and side walls of both sections.

2. A sled as set forth in claim 1 further including runner means on at least said front section and defined in said section.

3. A sled as set forth in claim 1 wherein said molded hinge means is flexible in a second plane normal to said first plane.

4. A sled as set forth in claim 2 wherein said molded hinge means is flexible in a second plane normal to said first plane.

5. A sled as set forth in claim 1 further including a windshield section hingedly connected to said front section by a molded hinge and handle slots formed in opposed sides of said windshield section.

6. A sled as set forth in claim 2 further including a windshield section hingedly connected to said front section by a molded hinge and handle slots formed in opposed sides of said windshield section.

7. A sled as set forth in claim 3 further including a windshield section hingedly connected to said front section by a molded hinge and handle slots formed in opposed sides of said windshield section.

8. A sled as set forth in claim 4 further including a windshield section hingedly connected to said front section by a molded hinge and handle slots formed in opposed sides of said windshield section.

9. A unitary box-like member having a bottom wall, front, rear and side walls,
   said side walls and bottom wall including a section in the form of a pleat extending down both walls and across the bottom wall to normally maintain the front and rear portions of the box in spaced aligned relationship,
   said pleat being sufficiently resilient to permit misalinement of said portions upon application of a sidewise force to one of said portions, and
   ground runner means carried by the bottom wall of said box.

10. A plurality of molded one piece steerable sleds as set forth in claim 9 nested one within the other.

* * * * *